(12) United States Patent
Keith

(10) Patent No.: US 8,879,278 B2
(45) Date of Patent: Nov. 4, 2014

(54) DATACOMMUNICATIONS/TELE-COMMUNICATIONS PATCHING SYSTEMS WITH BUNDLED PATCH CORD ASSEMBLY

(75) Inventor: Scott Keith, Hickory, NC (US)

(73) Assignee: CommScope, Inc., Hickory, NC (US)

( * ) Notice: Subject to any disclaimer, the term of this patent is extended or adjusted under 35 U.S.C. 154(b) by 215 days.

(21) Appl. No.: 13/344,031

(22) Filed: Jan. 5, 2012

(65) Prior Publication Data
US 2012/0195019 A1 Aug. 2, 2012

Related U.S. Application Data

(60) Provisional application No. 61/436,772, filed on Jan. 27, 2011.

(51) Int. Cl.
| | | |
|---|---|---|
| *H02B 1/20* | (2006.01) | |
| *H01B 7/00* | (2006.01) | |
| *F16L 3/08* | (2006.01) | |
| *F16L 3/12* | (2006.01) | |
| *H04Q 1/02* | (2006.01) | |
| *H04Q 1/06* | (2006.01) | |

(52) U.S. Cl.
CPC . *H04Q 1/06* (2013.01); *H04Q 1/023* (2013.01)
USPC .......................... 361/826; 174/72 A; 248/74.3

(58) Field of Classification Search
None
See application file for complete search history.

(56) References Cited

U.S. PATENT DOCUMENTS

| | | | | |
|---|---|---|---|---|
| 2,299,140 | A * | 10/1942 | Hanson | 174/72 A |
| 4,637,404 | A * | 1/1987 | Gessman | 607/126 |
| 4,683,349 | A * | 7/1987 | Takebe | 174/69 |
| 5,625,737 | A * | 4/1997 | Saito | 385/137 |
| 5,934,656 | A | 8/1999 | Carder | |
| 6,464,404 | B1 * | 10/2002 | Robinson et al. | 385/54 |
| 6,766,095 | B1 * | 7/2004 | Bjorklund | 385/135 |
| 7,238,889 | B2 * | 7/2007 | Rivera | 174/135 |
| 7,277,614 | B2 * | 10/2007 | Cody et al. | 385/100 |
| 7,751,206 | B2 * | 7/2010 | Kosacek et al. | 361/826 |
| 8,290,193 | B2 * | 10/2012 | Pang et al. | 381/374 |
| 8,437,147 | B2 * | 5/2013 | Dean et al. | 361/826 |
| 2003/0016989 | A1 * | 1/2003 | Wentworth et al. | 403/56 |
| 2004/0013387 | A1 * | 1/2004 | Wakileh et al. | 385/134 |
| 2005/0016617 | A1 | 1/2005 | Spain | |

(Continued)

OTHER PUBLICATIONS

Written Opinion of the International Preliminary Examining Authority for PCT/US2012/020251 mailed Dec. 2, 2013.

(Continued)

*Primary Examiner* — Hoa C Nguyen
*Assistant Examiner* — Xanthia C Cunningham
(74) *Attorney, Agent, or Firm* — Myers Bigel Sibley & Sajovec, P.A.

(57) ABSTRACT

A cord bundle assembly includes: a plurality of communications cords, each of the communications cords comprising a plurality of communications signal-carrying members, the communications cords being grouped as a bundle; and a cord management assembly. The cord management assembly includes: a fixed cuff that encircles and is fixed relative to the plurality of communications cords; a slip cuff that encircles and is slidable relative to the plurality of communications cords; and a generally cylindrical sleeve having first and second ends, the fixed cuff being mounted to the first end, and the slip cuff being mounted to the second end. This configuration can assist in the management and organization of cords arranged in a cord bundle as they are routed between communications equipment.

5 Claims, 8 Drawing Sheets

(56) References Cited

U.S. PATENT DOCUMENTS

| | | | |
|---|---|---|---|
| 2005/0057912 A1* | 3/2005 | Hardt et al. | 361/826 |
| 2006/0196995 A1* | 9/2006 | Mori et al. | 248/74.2 |
| 2007/0104448 A1* | 5/2007 | Allen | 385/135 |
| 2007/0209823 A1* | 9/2007 | Vexler et al. | 174/113 C |
| 2008/0002362 A1* | 1/2008 | Ishimine | 361/695 |
| 2008/0160837 A1* | 7/2008 | Siemon et al. | 439/676 |
| 2008/0180917 A1* | 7/2008 | Lawrence | 361/724 |
| 2009/0238395 A1* | 9/2009 | Jubelirer et al. | 381/370 |
| 2009/0273915 A1* | 11/2009 | Dean et al. | 361/826 |
| 2009/0301754 A1* | 12/2009 | Morley-Smith et al. | 174/113 R |
| 2010/0159741 A1* | 6/2010 | Rothbaum | 439/501 |
| 2010/0163278 A1* | 7/2010 | Grelck | 174/135 |

OTHER PUBLICATIONS

International Search Report and the Written Opinion for PCT/US2012/020251 mailed Apr. 3, 2012.

* cited by examiner

DATACOMMUNICATIONS/TELE-COMMUNICATIONS PATCHING SYSTEMS WITH BUNDLED PATCH CORD ASSEMBLY

RELATED APPLICATION

The present application claims the benefit of and priority from U.S. Provisional Patent Application No. 61/436,772, filed Jan. 27, 2011, the disclosure of which is hereby incorporated herein in its entirety.

FIELD OF THE INVENTION

The present invention relates generally to datacommunications/telecommunications equipment, and more particularly to high-density copper and fiber distribution apparatus.

BACKGROUND

In the datacommunications/telecommunications industry, the use of fiber optic cables for carrying transmission signals is rapidly and continually growing. To interconnect communication devices such as servers, routers and switches, fiber optic equipment, fiber distribution frames, racks and cabinets have been developed. Such frames, racks and cabinets are typically located in a communications closet, data room, data center or the like, where technicians can easily connect and reconnect, or "patch," equipment in an organized and efficient manner. Examples of fiber distribution frames and racks are shown in U.S. Pat. Nos. 5,497,444 and 5,758,003, which are hereby incorporated by reference.

With the increase in server deployments and use of other active network equipment utilizing fiber optic cables in the datacommunications/telecommunications industry (and often in conjunction with copper communications cables, cords and connections), it is desirable to provide fiber distribution frames/racks with increased density. "Density" refers to the number of locations, or ports, per unit volume or unit area for providing connections within the rack; thus, increased density can provide more connection/patching sites per rack. Many racks are configured to include multiple shelves or trays of a specific size (a standard height of 1.75 inches is known in the industry as a "U"); the size of a rack or cabinet may be described in terms of "U" (e.g., a "6U" rack), and the shelves and trays may be described by the number of connections per "U" (e.g., 48 connections/U). Some cabinets (so-called "0U" cabinets) have even been created that reserve all of the rack units for active computing equipment by utilizing space in the cabinet that is usually occupied by components for patching and cable/cord management. One benefit of this approach is the ability to preconfigure cabinets with the required copper and fiber connectivity for specific network equipment. This can allow for the rapid deployment of network equipment.

The space constraints associated with high-density distribution frames can cause cable and cord management problems. Effective cable/cord management can prevent excessive bending of fiber optic cables/cords within the frames. Effective cable/cord management may also reduce tangling of cables and cords, and may provide improved accessibility to components that may require servicing. Easily-understood labeling can also improve operator efficiency and accuracy. However, increased density can hamper desirable cable management practices, and the reduced volume available (such as in 0U cabinets) can make cable management more critical.

There is a desire to make cabinets "plug and play" to make deployments of cabinets more rapid and to increase reliability.

SUMMARY

As a first aspect, embodiments of the invention are directed to a cord bundle assembly. The cord bundle assembly comprises: a plurality of communications cords, each of the communications cords comprising a plurality of communications signal-carrying members, the communications cords being grouped as a bundle; and a cord management assembly. The cord management assembly comprises: a fixed cuff that encircles and is fixed relative to the plurality of communications cords; a slip cuff that encircles and is slidable relative to the plurality of communications cords; and a generally cylindrical sleeve having first and second ends, the fixed cuff being mounted to the first end, and the slip cuff being mounted to the second end. This configuration can assist in the management and organization of cords arranged in a cord bundle as they are routed between communications equipment.

As a second aspect, embodiments of the invention are directed to a module adapted for use with a telecommunications rack, frame or cabinet, comprising: a generally upright divider panel; a cover panel disposed generally parallel to the divider panel, the cover panel and divider panel being spaced apart from each other to form a gap; and a plurality of telecommunications cords, each of the telecommunications cords comprising a plurality of telecommunications patch cords, the cords being positioned in the gap between the divider panel and cover panel. The cords are received in a cord management assembly that comprises: a fixed cuff that encircles and is fixed relative to the plurality of communications cords; a slip cuff that encircles and is slidable relative to the plurality of communications cords; and a generally cylindrical sleeve having first and second ends, the fixed cuff being mounted to the first end, and the slip cuff being mounted to the second end.

As a third aspect, embodiments of the present invention are directed to a module adapted for use with a telecommunications rack, frame or cabinet, comprising: a generally upright divider panel; a cover panel disposed generally parallel to the divider panel, the cover panel and divider panel being spaced apart from each other to form a gap; and a plurality of telecommunications cords, each of the telecommunications cords comprising a plurality of telecommunications patch cords, the cords being positioned in the gap between the divider panel and cover panel. The cords are received in a cord management assembly that comprises: a fixed cuff that encircles and is fixed relative to the plurality of communications cords; a slip cuff that encircles and is slidable relative to the plurality of communications cords; and a generally cylindrical sleeve having first and second ends, the fixed cuff being mounted to the first end, and the slip cuff being mounted to the second end. The cylindrical sleeve comprises a material that enables the sleeve to shrink in length as it expands in circumference. The slip cuff is fixedly mounted relative to at least one of the divider panel and the cover panel.

DETAILED DESCRIPTION

Figure 1:
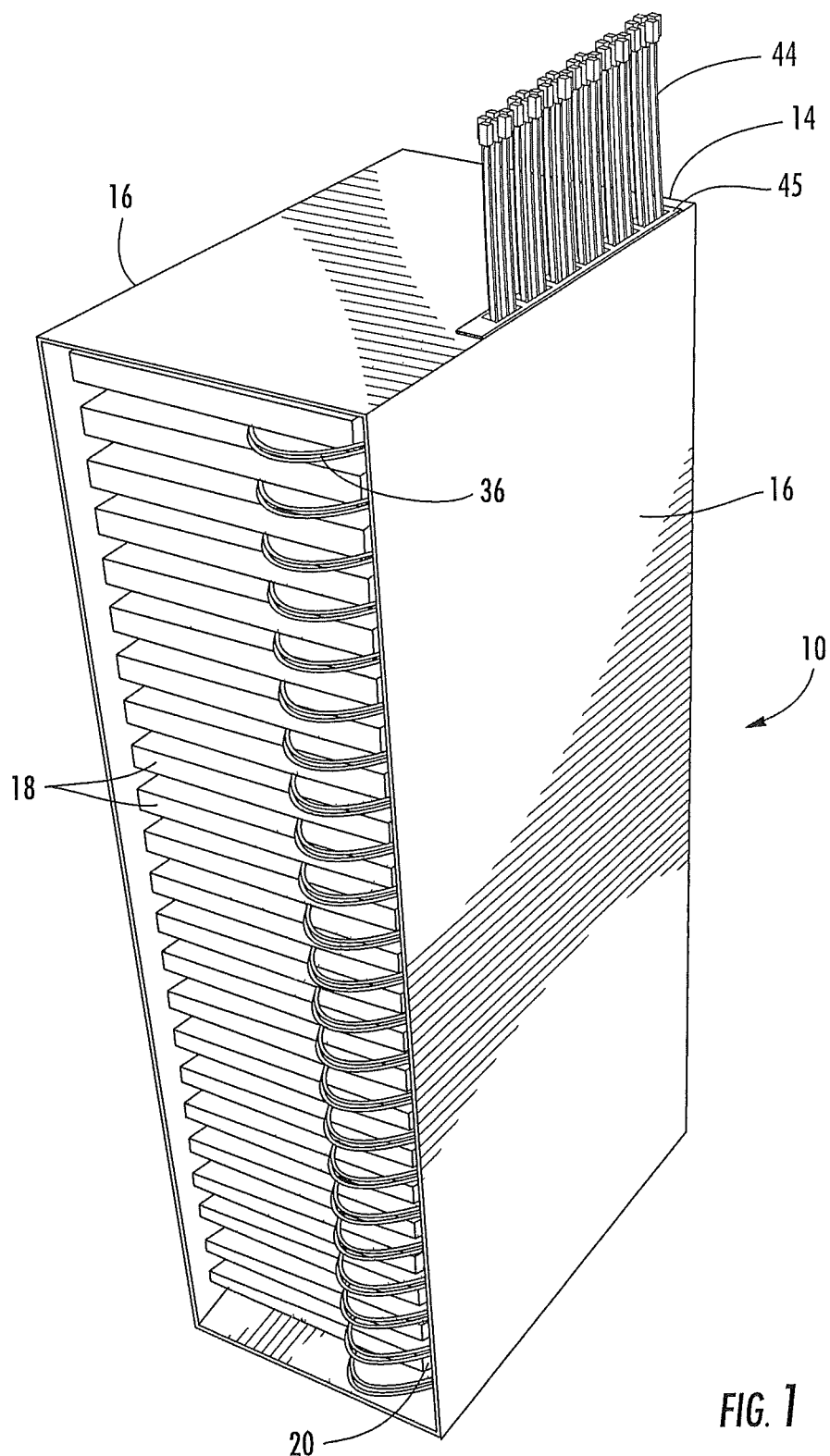
FIG. 1 is a perspective view of a communications cabinet that comprises an interconnection module according to embodiments of the present invention.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity. Well-known functions or constructions may not be described in detail for brevity and/or clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items. In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Referring now to the figures, a communications cabinet, designated broadly at 10, is shown in FIG. 1. The cabinet 10 includes a front wall (not shown), a rear wall 14, and opposing side panels 16. A plurality of datacommunications servers 18 (or other active network equipment) are mounted within the cabinet 10. Those skilled in this art will recognize that in some embodiments the cabinet may be replaced with a frame, rack or other datacommunications equipment mounting structure.

Figure 2:
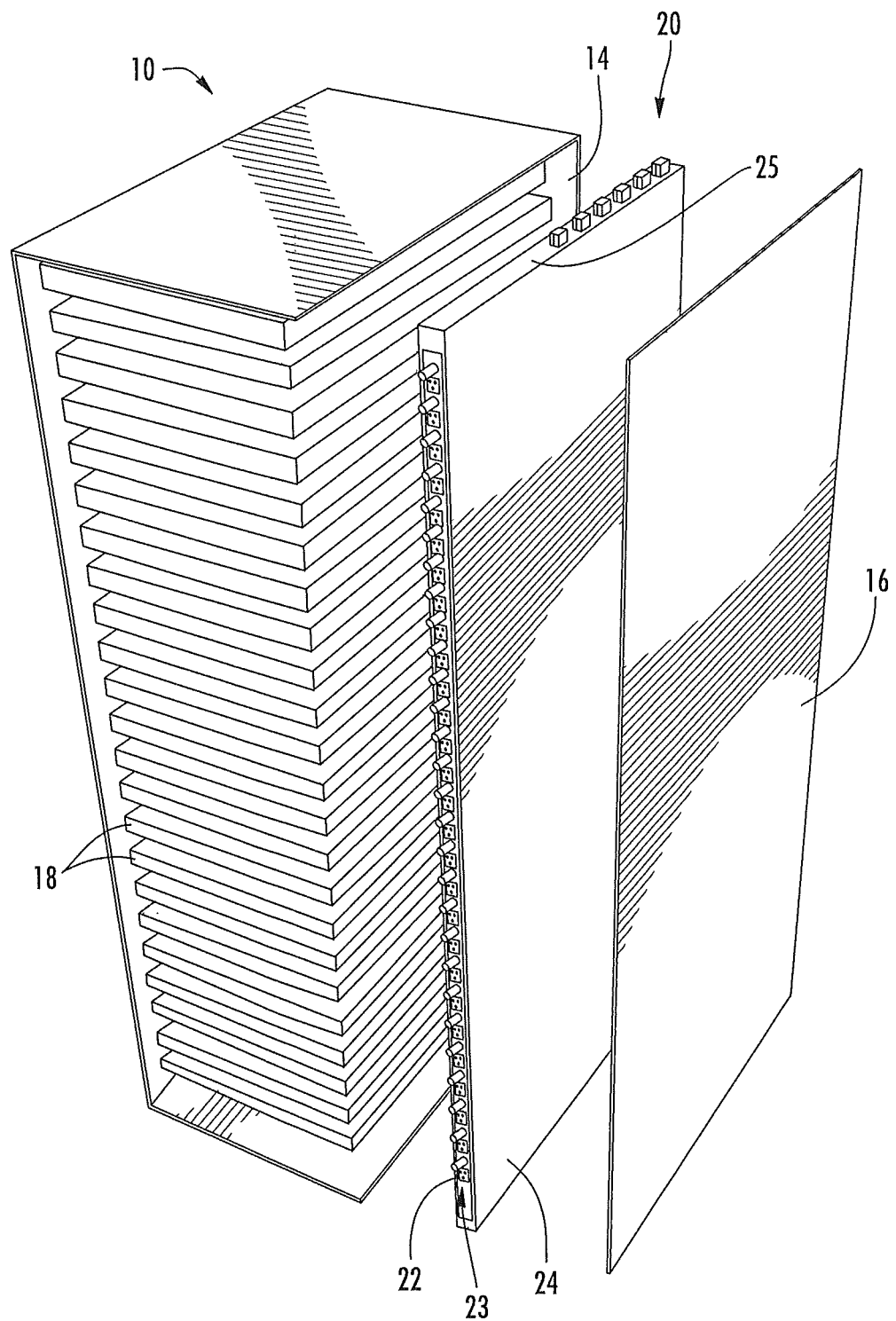
FIG. 2 is an exploded perspective view of the cabinet and module of FIG. 1.
Figure 3:
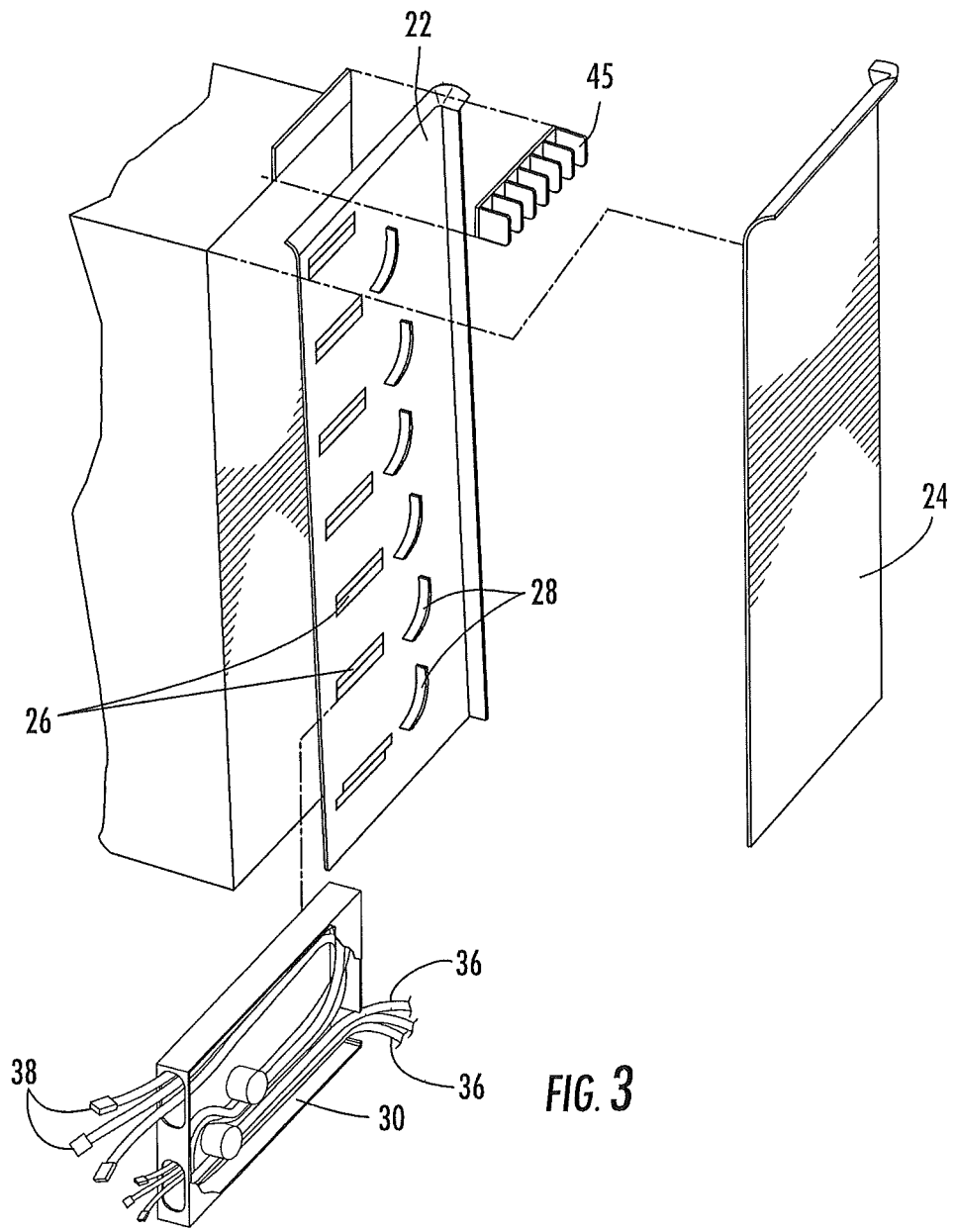
FIG. 3 is a further exploded perspective view of the module of FIG. 1.

Referring now to FIG. 2, the cabinet 10 also includes an interconnection module 20 positioned just inwardly from one of the side panels 16. The module 20 may be integrated into the cabinet 10, or may be added separately to an existing cabinet 10. As can be seen in FIGS. 2 and 3, the module 20 includes a divider panel 22 that separates the module 20 from the cavity of the cabinet 10 and a cover panel 24 (in some embodiments, one of the side walls 16 of the cabinet 10 may serve as the cover panel 24). An upper panel 25 spans the upper edges of the divider panel 22 and the cover panel 24. The divider panel 22 and the cover panel 24 form a narrow gap 23; in some embodiments, the gap 23 is between about 0.5 and 3.5 inches in width, such that the entire module 20 is between about 1 and 4 inches in width. The divider panel 22 includes multiple horizontally-disposed cassette guides 26 (see FIG. 3).

FIG. 3 also illustrates one exemplary patch cord cassette 30 that engages one or more of the cassette guides 26; in a typical module 20, multiple cassettes 30 are included and are arranged in a vertical stack separated by the cassette guides 26 (see FIG. 2). Details of the structure and function of exemplary cassettes are provided in co-assigned and co-pending U.S. patent application Ser. No. 12/862,105, filed Aug. 24, 2010, the disclosure of which is hereby incorporated herein in its entirety. A plurality of unbundled (i.e., separated) patch cords 36 are routed into and out of the cassette 30. Those skilled in this art will recognize that the patch cords 36 may be fiber optic patch cords, copper patch cords, or a combination of fiber optic and copper patch cords that are communications signal-carrying members. The arrangement of the patch cords 36 within the cassette 30 enables the patch cords 36 to move between a stored position and an extended position, in which the terminals 38 of the patch cords 36 extend forwardly away from the housing of the cassette 30. From this position, the patch cords 36 can be connected to one of the servers 18 of the cabinet 10 (see FIG. 1).

Referring back to FIGS. 1 and 2, the ends of the patch cords 36 of each cassette 30 opposite the terminals 38 are gathered into a cord bundle 44 (the bundle may be created by associated loose patch cords with a twist tie or the like, or the patch cords may be joined or connected with a web, jacket or the like). The cord bundle 44 is routed from the entry aperture into a downwardly-extending slack loop 44a (seen in FIG. 4), then upwardly to a patch pack organizer 45 (shown in FIG. 3) that is attached to the upper panel 25 of the module 20. The cord bundle 44 is able to extend from the module 20 to interconnect with other equipment, such as an overhead patch panel. The distance of cord bundle extension from the module 20 is typically between about 1 and 3 feet, and may be as much as 6 feet or more.

Figure 4:
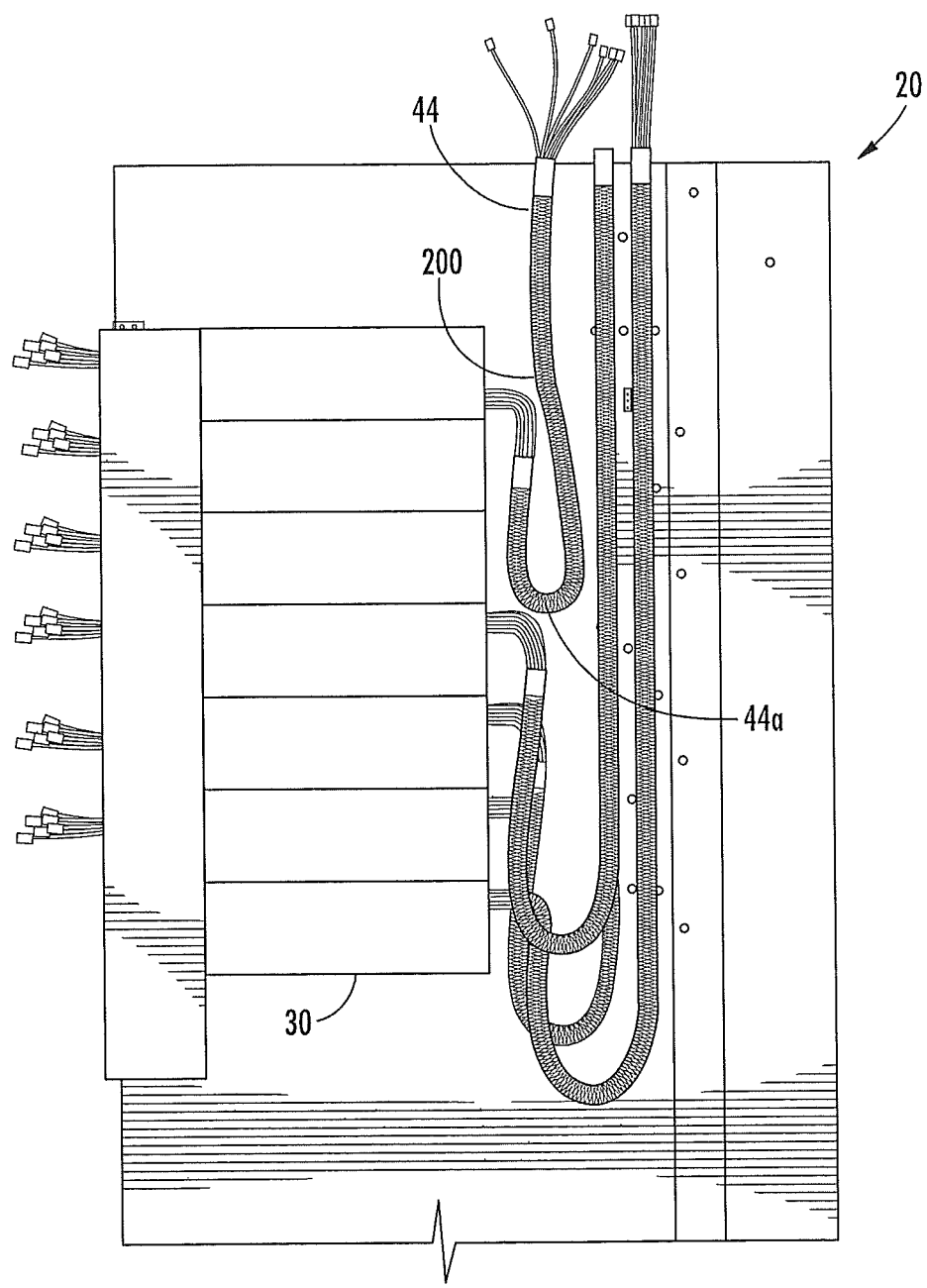
FIG. 4 is a side view of an interconnection module similar to that shown in FIG. 1 showing the cord bundles with slack loops.

This arrangement can be seen in FIG. 4. A cord bundle 44 enters the upper edge of the module 20. Guides/posts may be present to organize the cord bundle 44 and to form the slack loops 44a so that they may be extended/retracted from the module 20. Each of the cord bundles 44 is routed through the guides to an entry aperture of one of the cassettes 30. The patch cords 36 of the cord bundles 44 are separated, threaded within the structures within the cassettes 30, and routed out of exit apertures of the cassettes 30. From this position the patch cord 36 can be interconnected with one of the servers 18 of the cabinet 10.

Retraction, extension and management of the cords of the cord bundles 44 can be enhanced by a cord management assembly 200, which can be seen in FIGS. 4-9. The cord management assembly 200 includes a fixed cuff 202, a slip cuff 204, and a sleeve 212. These components are discussed below.

Figure 5:
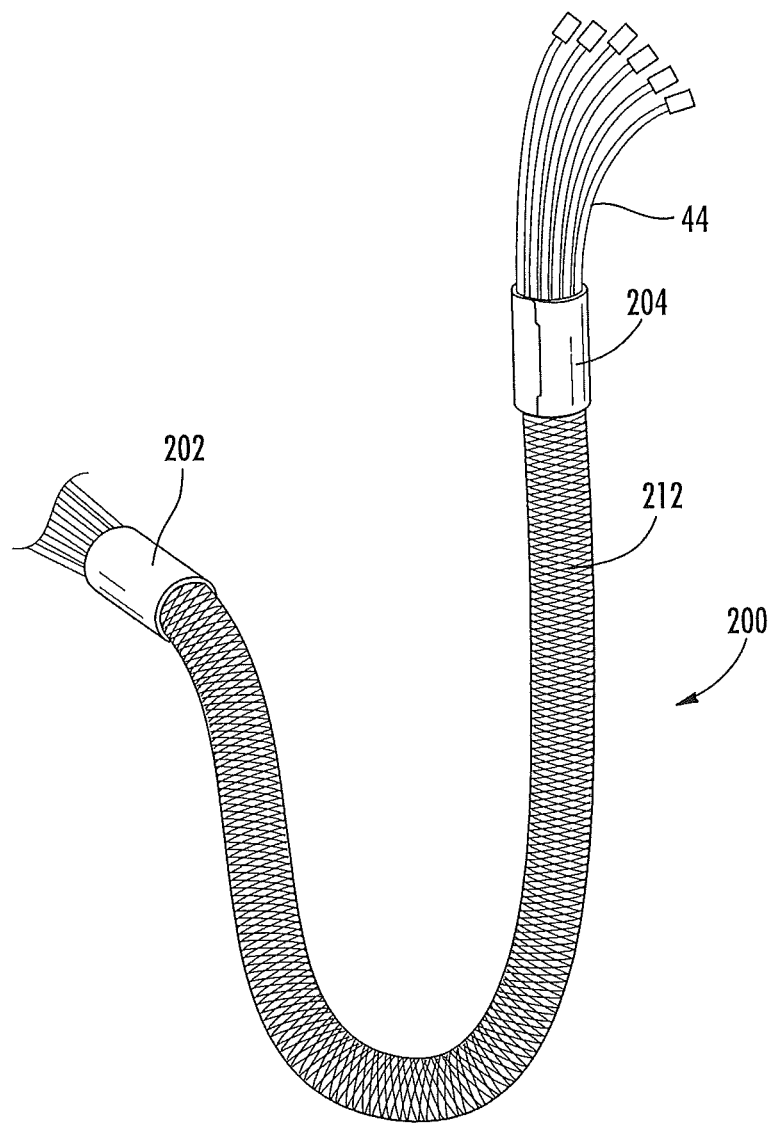
FIG. 5 is an enlarged side view of the cord management assembly of FIG. 4, with the cord bundles retracted and the sleeve covering the slack loop in a relaxed condition.
Figure 8:
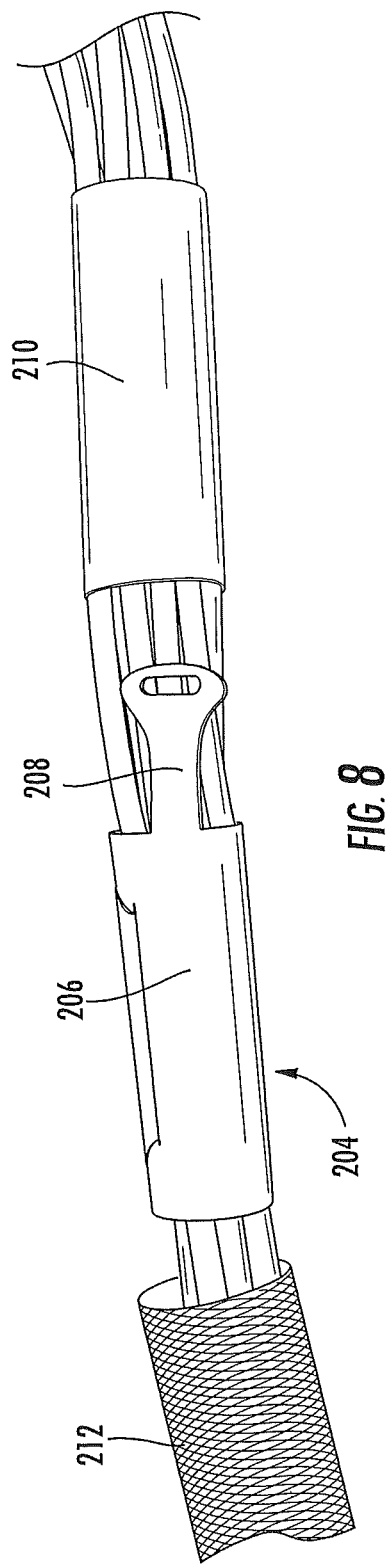
FIG. 8 is an exploded side view of the slip cuff and sleeve of the cord assembly of FIG. 5.

Referring first to FIGS. 5 and 8, the sleeve 212 may be of generally cylindrical construction and receives the cords 36 of the cord bundle 44 therewithin. The sleeve 212 is typically formed of an elastic material, and may be formed of an elastic material that shortens in length as it is stretched along its width (or, as in this case, when its circumference increases). An exemplary material for the sleeve 212 is polyester expandable mesh, available from McMaster-Carr, Elmhurst, Ill.

Referring again to FIG. 5, the fixed cuff 202 is attached to one end of the sleeve 212. The fixed cuff 202 encircles and is fixed to or relative to the patch cords 36 of the cord bundle 44, such that the patch cords 36 do not move or slide relative to the fixed cuff 202. The fixed cuff 202 may be fixed relative to the patch cords 36 via an interference fit, adhesives, or the like. The fixed cuff 202 may be formed of any material with sufficient integrity to maintain the fixed relationship with the patch cords 36. An exemplary material for the fixed cuff 202 is polyolefin (heat-shrink tubing).

Referring again to FIGS. 5 and 8, the slip cuff 204 is fixed to the end of the sleeve 212 opposite the fixed cuff 202. In the illustrated embodiment, the slip cuff 204 includes an inner cylinder 206 and an outer sheath 210. The inner cylinder 206 is typically formed of a relative flexible polymeric material, such as polypropylene. A tab 208 or other projection that extends away from the sleeve 212 and is generally parallel with the patch cords 36 may be included with the inner cylinder 206. The outer sheath 210 fits over some or all of the inner cylinder 206 and over the end of the sleeve 212, thereby fixing the slip cuff 204 to the sleeve 212 (see FIG. 9); attachment of the outer sheath 210 to the sleeve 212 may be via adhesives or any number of other fastening techniques. The inner cylinder 206 encircles the patch cords 36 and is sized such that the patch cords 36 are free to slide relative to the inner cylinder 206.

Figure 6:
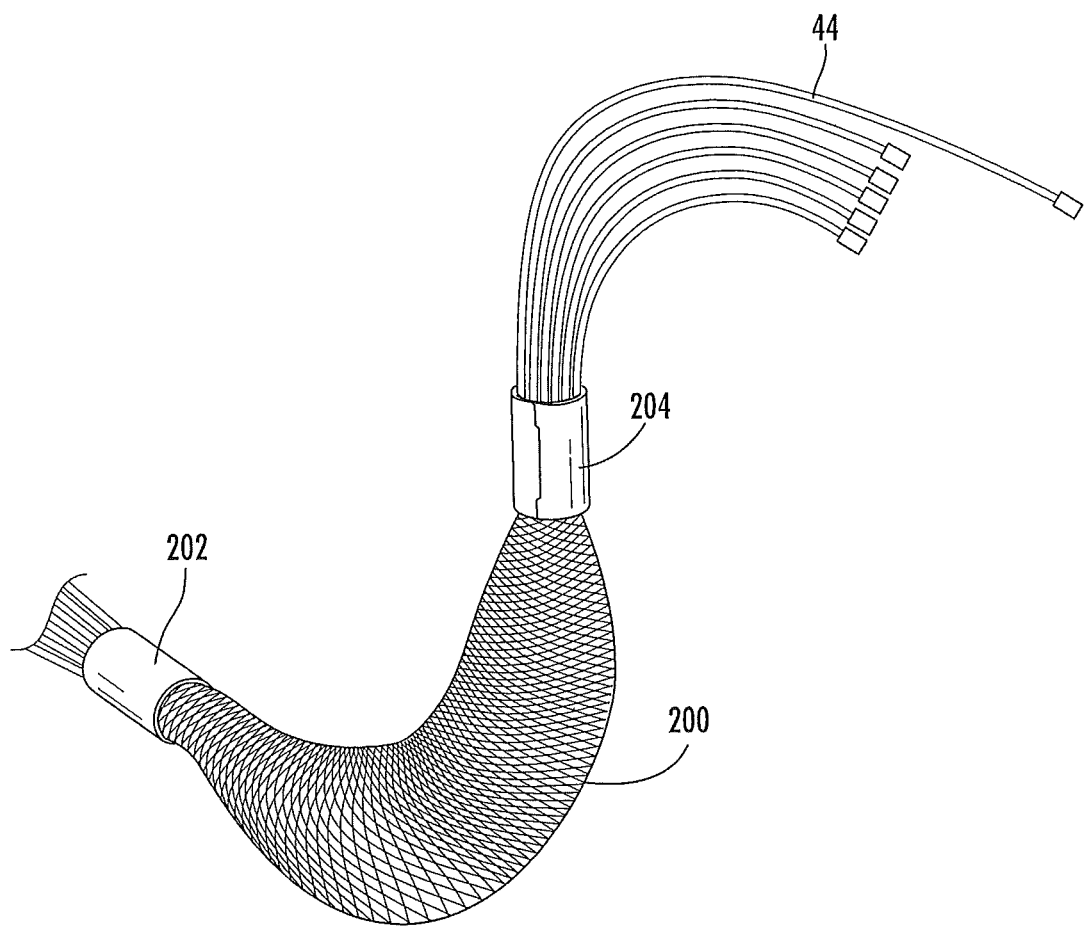
FIG. 6 is an enlarged side view of the cord management assembly of FIG. 5 with a patch cord extended and the sleeve covering the slack loop contracted.
Figure 7:
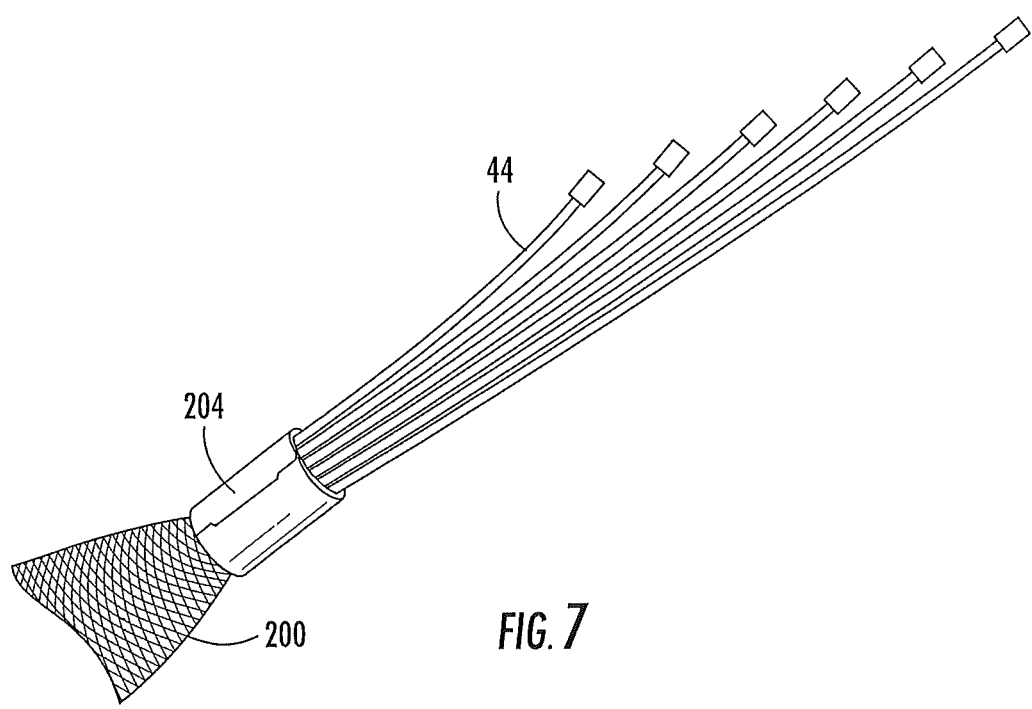
FIG. 7 is a greatly enlarged perspective view of the slip cuff and cords of the cord bundle assembly of FIG. 5 showing the patch cords extended to different lengths.

Operation of the cord management assembly 200 can be understood with reference to FIGS. 5-7. Prior to interconnection with communications equipment such as a patch panel, network switch or other termination device, the cord bundle 44 resides in the module 20 with a slack loop 44a and the cord bundle 44 extending through the top of the cabinet with the slip cuff 204 fixed to the top of the cabinet as is shown in FIG. 4. In some embodiments, the slip cuff 204 is fixed to one of the divider panel 22 and the cover panel 24 of the interconnection module 20. The sleeve 212 is relatively relaxed in a U-shaped arrangement, and the patch cords 36 are fully retracted into the sleeve 212 (see FIG. 5). When the group of patch cords 36 within a cord management assembly 200 is extended to be connected with telecommunications equipment, the slack loop 44a (along with the cord management assembly 200) is shortened. The shortened sleeve 212 expands in diameter (as can be seen in FIG. 6) and creates space within the sleeve 212 such that individual cords 36 in the bundle 44 can be separated and retracted by varying amounts. As noted above, the decrease in the length causes the sleeve 212 to increase in diameter, as the slack loop 44a is drawn toward the slip cuff 204. The result is a somewhat shorter, wider sleeve 212 (FIG. 6), which maintains the patch cords 36 of a cord bundle 44 in a relatively organized fashion. As other patch cords 36 are extended, as in FIG. 7, the sleeve 212 may further shrink in length and/or increase in circumference as needed. Irrespective of the number of patch cords 36 that are extended, the patch cords 36 remain organized within the sleeve 212. If a patch cord 36 is retracted (for example, if it is disconnected from a communications component), it can return to its original position (or a very similar position) within the sleeve 212.

Figure 9:
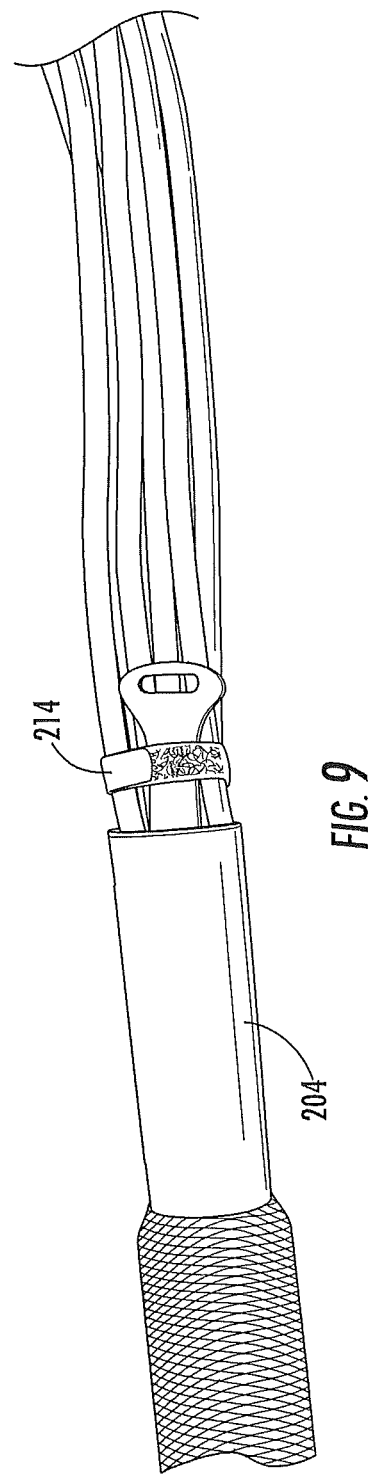
FIG. 9 is a side view of the slip cuff and sleeve of the cord assembly of FIG. 5 showing the patch cords secured into place.

As shown in FIG. 9, when the patch cords 36 have been extended in a desired manner, they can be fixed in place with a tie strap 214 or the like wrapped around the tab 208. Fixing the patch cords 36 in place with the tie strap 214 can provide strain relief to the patch cords 36.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A module adapted for use with a telecommunications rack, frame or cabinet, comprising:
   a generally upright divider panel;
   a cover panel disposed generally parallel to the divider panel, the cover panel and divider panel being spaced apart from each other to form a gap;
   a plurality of telecommunications cords, each of the telecommunications cords comprising a plurality of telecommunications patch cords, the cords being positioned in the gap between the divider panel and cover panel;
   wherein the cords are received in a cord management assembly, comprising:
      a fixed cuff that encircles and is fixed relative to the plurality of communications cords;
      a slip cuff that encircles and is slidable relative to the plurality of communications cords; and
      a generally cylindrical sleeve having first and second ends, the fixed cuff being mounted to the first end, and the slip cuff being mounted to the second end;
   wherein the cylindrical sleeve comprises a material that enables the sleeve to shrink in length as it expands in circumference; and
   wherein the slip cuff is fixedly mounted relative to at least one of the divider panel and the cover panel.

2. The module defined in claim 1, wherein the slip cuff comprises a projection that extends generally parallel to the cords away from the sleeve.

3. The module defined in claim 2, further comprising a tie strap that encircles the cords and the projection.

4. The module defined in claim 1, further comprising at least one cassette mounted within the gap, wherein the patch cords of the cord bundle are routed into the cassette.

5. The module defined in claim 1, in combination with a communications cabinet.

* * * * *

UNITED STATES PATENT AND TRADEMARK OFFICE
CERTIFICATE OF CORRECTION

PATENT NO. : 8,879,278 B2  Page 1 of 1
APPLICATION NO. : 13/344031
DATED : November 4, 2014
INVENTOR(S) : Scott Keith It is certified that error appears in the above-identified patent and that said Letters Patent is hereby corrected as shown below:

On Title Page:
Item (73), Assignee:
    Please correct "CommScope, Inc., Hickory, NC (US)"
        to read -- CommScope, Inc. of North Carolina, Hickory, NC (US) --

Signed and Sealed this
Third Day of March, 2015

Michelle K. Lee
*Deputy Director of the United States Patent and Trademark Office*